United States Patent
Honjo et al.

(10) Patent No.: US 7,917,664 B2
(45) Date of Patent: Mar. 29, 2011

(54) STORAGE APPARATUS, STORAGE APPARATUS CONTROL METHOD, AND RECORDING MEDIUM OF STORAGE APPARATUS CONTROL PROGRAM

(75) Inventors: Nobuyuki Honjo, Kawasaki (JP); Yukihiro Yoshiya, Kawasaki (JP); Atsuhiro Otaka, Kawasaki (JP); Hidetoshi Satou, Kawasaki (JP); Oumar Thielo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 11/896,296

(22) Filed: Aug. 30, 2007

(65) Prior Publication Data
US 2008/0155133 A1 Jun. 26, 2008

(30) Foreign Application Priority Data
Dec. 22, 2006 (JP) .................... 2006-346685

(51) Int. Cl.
*G06F 3/00* (2006.01)
(52) U.S. Cl. ................. 710/15; 710/19; 710/74; 714/39
(58) Field of Classification Search .............. 710/15, 710/19, 74; 714/39
See application file for complete search history.

(56) References Cited

U.S. PATENT DOCUMENTS

| | | | |
|---|---|---|---|
| 5,586,250 A | 12/1996 | Carbonneau et al. | |
| 5,790,779 A * | 8/1998 | Ben-Natan et al. ............. | 714/39 |
| 5,835,700 A | 11/1998 | Carbonneau et al. | |
| 5,838,891 A | 11/1998 | Mizuno et al. | |
| 5,966,510 A | 10/1999 | Carbonneau et al. | |
| 7,308,534 B2 * | 12/2007 | Mimatsu ....................... | 711/114 |
| 2004/0117546 A1 * | 6/2004 | Mizuno .......................... | 711/112 |
| 2006/0075154 A1 * | 4/2006 | Carlson et al. .................. | 710/15 |
| 2006/0112198 A1 * | 5/2006 | Kurokawa et al. ............. | 710/19 |
| 2006/0155928 A1 * | 7/2006 | Mimatsu ....................... | 711/112 |
| 2007/0050425 A1 * | 3/2007 | Ichikawa et al. .............. | 707/201 |
| 2007/0101059 A1 * | 5/2007 | Kobayashi et al. ........... | 711/114 |
| 2007/0220313 A1 * | 9/2007 | Katsuragi et al. ................ | 714/6 |
| 2007/0260918 A1 * | 11/2007 | Okada et al. .................... | 714/14 |
| 2007/0300013 A1 * | 12/2007 | Kitamura ....................... | 711/114 |
| 2008/0016303 A1 * | 1/2008 | Okumoto et al. ............ | 711/162 |
| 2008/0147934 A1 * | 6/2008 | Nonaka et al. .................. | 710/74 |

FOREIGN PATENT DOCUMENTS

| | | |
|---|---|---|
| JP | 8-263225 | 10/1996 |
| JP | 9-508990 | 9/1997 |
| JP | 09-259050 | 10/1997 |
| WO | 95/13581 | 5/1995 |

\* cited by examiner

*Primary Examiner* — Chun-Kuan Lee
*Assistant Examiner* — Ernest Unelus
(74) *Attorney, Agent, or Firm* — Staas & Halsey LLP

(57) ABSTRACT

A storage apparatus having a plurality of storage units for storing data comprises: a detecting module for detecting status information indicative of the operation environment of said storage apparatus; a controlling module for accessing said data in said storage unit, said controlling module performing processing in accordance with said status information; and a relaying module for relaying said data between said controlling module and said storage units, storing the status information, and transmitting said status information stored in said relaying module to said controlling module in response to a request from said controlling module.

6 Claims, 11 Drawing Sheets

STORAGE APPARATUS, STORAGE APPARATUS CONTROL METHOD, AND RECORDING MEDIUM OF STORAGE APPARATUS CONTROL PROGRAM

BACKGROUND OF THE INVENTION

1. Field of the Invention

The present invention relates to storage apparatuses, and, more particularly, to a technique for interconnecting a controller of a storage apparatus to each unit.

2. Description of the Related Art

Storage apparatuses are used to store or read out data on or from a memory such as a hard disk drive (HDD), and include a control unit for controlling the entire processing of the storage apparatus and a storage unit for storing data. Furthermore, storage apparatuses include a power supply unit, a fan unit, and a thermometer unit which are used to maintain the environment of the storage apparatus.

Protocols for interfaces of storage apparatuses include the SAS (Serial Attached SCSI) protocol. In the SAS protocol, an expander unit functions as a relay between a controller unit of a storage apparatus and each of many units. An expander unit is connected to a storage unit, a PSU (Power Supply Unit), a fan unit, and a thermometer unit, and acquires environmental information (status information) from each of the PSU, the fan unit, and the thermometer unit every predetermined point in time. If the expander unit detects a change in the environmental information of any one of these units, the expander unit transmits the detection result to a controller unit. The controller unit checks the state of a corresponding unit each time it receives a notification that an unusual change in environmental information has occurred from the expander unit compliant with the SAS protocol. For example, if there is a poor contact at a connector of a unit, an abnormal state and a normal state may be repeated in accordance with the vibration of a storage apparatus.

If the change in environmental information often occurs, the expander unit transmits a notification about the occurrence of the change to the controller unit each time the change occurs. The exchange of environmental information between the controller unit and the expander unit and the exchange of data between each storage unit and the controller unit which the storage apparatus performs so as to store or read out data in or from a corresponding storage unit are performed via the same transmission line. Accordingly, many exchanges of environmental information between the controller unit and the expander unit interfere with the transmission of data between the controller unit and the expander unit which the storage apparatus performs so as to store or read out data in or from a corresponding storage unit.

Known techniques are disclosed in Japanese Unexamined Patent Application Publication Nos. 9-508990 and 9-259050.

SUMMARY OF THE INVENTION

It is an object of the present invention to provide a storage apparatus capable of effectively transmitting data between an expander unit and a controller unit.

According to an embodiment of the present invention, there is provided the following storage apparatus.

A storage apparatus according to an embodiment of the present invention includes: a detection unit for detecting a state of the storage apparatus; a controller unit for performing processing in accordance with the detected state of the storage apparatus; and a relay unit for acquiring status information on a state of the storage apparatus from the detection unit, storing the acquired status information, and transmitting the stored status information to the controller unit upon receiving a status information acquisition request from the controller unit, the relay unit being disposed between the controller unit and the detection unit.

The relay unit included in the storage apparatus transmits information representing that the state of the storage apparatus has been changed to the controller unit if the relay unit has not yet transmitted the information to the controller unit.

The relay unit included in the storage apparatus transmits information representing that the state of the storage apparatus has been changed to the controller unit when the relay unit determines that there is a change from previously acquired status information on a state of the storage apparatus to the status information acquired from the detection unit.

The relay unit included in the storage apparatus has a flag for indicating whether the relay unit has already transmitted information representing that the state of the storage apparatus has been changed to the controller unit.

In the storage apparatus, the controller unit and the relay unit are connected to each other using the SAS protocol.

According to an embodiment of the present invention, the number of exchanges of environmental information between an expander unit and a controller unit can be reduced. As a result, a transmission capacity required for data transmission between the expander unit and the controller unit for data writing or data reading in or from a storage unit can be ensured. Consequently, there can be provided a storage apparatus capable of effectively transmitting data between an expander unit and a controller unit.

DESCRIPTION OF THE PREFERRED EMBODIMENTS

Figure 1:
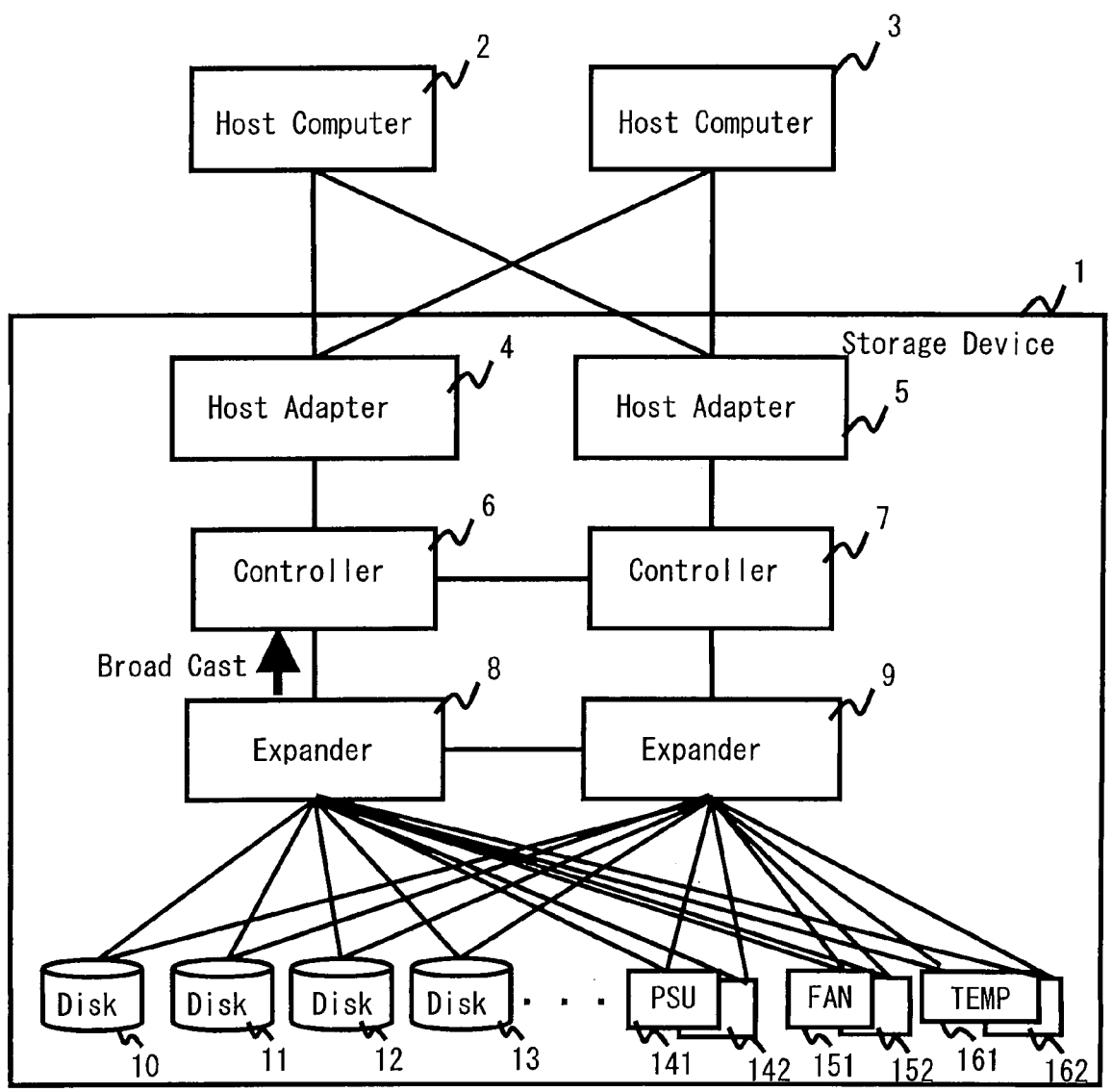
FIG. 1 is a block diagram of a storage system according to an embodiment of the present invention.

FIG. 1 is a block diagram of a storage system according to an embodiment of the present invention. A storage system according to an embodiment of the present invention includes a host computer 2, a host computer 3, and a storage apparatus 1.

Each of the host computer 2 and the host computer 3 is used to manage the entire network, and performs computation processing, network management, and control processing. Data transmission between the host computer 2 and the storage apparatus 1 and data transmission between the host computer 3 and the storage apparatus 1 are performed in accordance with the SAS, iSCSI, or Fibre Channel protocol.

The storage apparatus 1 stores or reads out data in response to a command transmitted from the host computer 2 or the host computer 3. In the storage apparatus 1 according to an embodiment of the present invention, the SAS (Serial Attached SCSI) protocol is used. The SAS protocol is a kind of the SCSI (Small Computer System Interface) protocol that defines a method of connecting a computer to a peripheral device, and enables SCSI serial communication by employing an interface compliant with the SATA (Serial Advanced Technology Attachment) protocol. The SATA protocol is a serial transfer version of the ATA (Advanced Technology Attachment) protocol that employs a parallel transfer method. The ATA protocol is one of formal IDE (Integrated Drive Electronics) protocols that define a method of connecting a computer to a hard disk.

It is important that the storage apparatus 1 can always transmit or receive data to or from the host computer 2 and the host computer 3. Accordingly, it is required to prevent the storage apparatus 1 from shutting down when the failure of a certain unit included in the storage apparatus 1 occurs. For that reason, the storage apparatus 1 has a redundant configuration in which a plurality of units having the same function are included. In the storage apparatus 1 shown in FIG. 1, there is redundancy between the following units: a host adapter unit 4 and a host adapter unit 5; a controller unit 6 and a controller unit 7; an expander unit 8 and an expander unit 9; a power supply unit (PSU) 141 and a power supply unit (PSU) 142; a fan unit (FAN) 151 and a fan unit (FAN) 152; and a thermometer unit (TEMP) 161 and a thermometer unit (TEMP) 162. According to this embodiment, controlling module is the controller unit.

The storage apparatus 1 includes the host adapter unit 4, the host adapter unit 5, the controller unit 6, the controller unit 7, the expander unit 8, the expander unit 9, storage units (Disks) 10 through 13, the PSU 141, the PSU 142, the FAN 151, the FAN 152, the TEMP 161, and the TEMP 162. These units perform their functions by electrically connecting to each other in the cabinet of the storage apparatus 1.

The host adapter unit 4 and the host adapter unit 5, which are included in the storage apparatus 1, are interfaces used to connect the storage apparatus 1 to the host computer 2 and the host computer 3. There is redundancy between the host computer 2 and the host computer 3 and between units having the same function included in the storage apparatus 1. Each of the host computer 2 and the host computer 3 is connected to the host adapter unit 4 and the host adapter unit 5. The host adapter unit 4 and the host adapter unit 5 are connected to the controller unit 6 and the controller unit 7, respectively, in accordance with the SAS, iSCSI, or FC protocol.

The controller unit 6 and the controller unit 7, which are included in the storage apparatus 1, manage the entire state of the storage apparatus 1, and control the entire operation of the storage apparatus 1. More specifically, each of the controller unit 6 and the controller unit 7 performs processing for storing data transmitted from the host computer 2 or the host computer 3 in a storage unit included in the storage apparatus 1, processing for reading out data stored in a storage unit in response to a data request command transmitted from the host computer 2 or the host computer 3 and transmitting the read data to the host computer 2 or the host computer 3, and processing for monitoring the states of the PSU 141, the PSU 142, the FAN 151, the FAN 152, the TEMP 161 and the TEMP 162 which are included in the storage apparatus 1.

The expander unit 8 functions as a relay between the controller unit 6 and each unit in the storage apparatus 1. The expander unit 9 functions as a relay between the controller unit 7 and each unit in the storage apparatus 1. Furthermore, the expander unit 8 functions as a piece of hardware compliant with the SAS protocol in the storage apparatus 1 and is used to add the number of drives which the controller unit 6 can manage. The expander unit 9 functions as a piece of hardware compliant with the SAS protocol in the storage apparatus 1 and is used to add the number of drives which the controller unit 7 can manage. Each of the expander unit 8 and the expander unit 9 is connected to many storage units. Furthermore, each of the expander unit 8 and the expander unit 9 is connected to the PSU 141, the PSU 142, the FAN 151, the FAN 152, the TEMP 161, and the TEMP 162. According to this embodiment, relaying module is the expander unit. According to this embodiment, detecting modules are the PSU, the FAN, and the TEMP.

A unit whose environmental information will be acquired is referred to as a monitoring target unit. In this embodiment, the storage units 10 to 13, the PSU 141, the PSU 142, the FAN 151, the FAN 152, the TEMP 161, and the TEMP 162 are the monitoring target units. The environmental information denotes data of a present environmental state of a unit.

The storage units 10 to 13 are units for storing data. In this embodiment, for convenience of explanation, the storage units 10 to 13 are used. However, there are other storage units that are connected to each of the expander unit 8 and the expander unit 9 or are connected to each of the controller unit 6 and the controller unit 7 in the storage apparatus 1. Each of the storage units 10 to 13 stores data transmitted from the host computer 2 or the host computer 3 to the storage apparatus 1. In addition, each of the storage units 10 to 13 transmits corresponding data in response to a data reading command transmitted from the host computer 2 or the host computer 3. The storage units 10 to 13 are, for example, hard disk devices. A command transmitted from the host computer 2 or the host computer 3 is transmitted to the controller unit 6 and the controller unit 7 via the host adapter unit 4 and the host adapter unit 5, respectively, in the storage apparatus 1. The controller unit 6 and the controller unit 7 transfer the command to a corresponding storage unit via the expander unit 8 and the expander unit 9, respectively. The storage units 10 to 13 may have a function of outputting failure information of the storage unit as environmental information.

The PSU 141 and the PSU 142 are units for supplying power from an external power supply to each unit included in the storage apparatus 1. Each of the PSU 141 and the PSU 142 has a function of outputting information on a voltage value thereof as environmental information.

The FAN 151 and the FAN 152 are units for ventilating the storage apparatus 1 to cool units included in the storage apparatus 1. Heat occurring in the storage apparatus 1 reduces the processing power of each unit or causes the abnormal operation of each unit. In addition, each of the FAN 151 and the FAN 152 has a function of outputting information on the number of rotations thereof as environmental information.

The TEMP 161 and the TEMP 162 are units for detecting the temperature of the storage apparatus 1, and have a function of outputting information on a detected temperature as environmental information.

The controller unit 6 and the controller unit 7 are connected to each other in accordance with the PCI Express (Peripheral Component Interconnect Express) standard that was designed as a serial transfer interface format to replace the PCI (Peripheral Component Interconnect) bus standard. The PCI bus standard is a standard for a data bus that connects units included in a computer.

The expander unit 8 and the expander unit 9 are connected to each other in accordance with the SAS protocol. The controller unit 6 and the expander unit 8 are connected to each other in accordance with the SAS protocol. The controller unit 7 and the expander unit 9 are connected to each other in accordance with the SAS protocol. The controller unit 6 has a port for connecting to the expander unit 8. The controller unit 7 has a port for connecting to the expander unit 9. A port is composed of a Phy that is an interface for data exchange between units. A physical link between units based on the SAS protocol is achieved using Phys of the units. Accordingly, a port included in each unit is composed of one or more Phys. A narrow port of a unit is composed of one Phy. A wide port of a unit is generally composed of four Phys. Each unit has a unique SAS address that is an identifier for specifying a unit. All Phys included in the same port share the SAS address of a unit connected to the port. Each unit that is connected to another unit in accordance with the SAS protocol stores the relationship between a Phy included in the unit and a unit connected to the Phy. However, in the case of a subtractive Phy among Phys included in a unit, the SAS address of a unit connected to the subtractive Phy is not stored. As described previously, the expander unit 8 and the expander unit 9 are connected to each other in accordance with the SAS protocol. A Phy of the expander unit 8 connected to the expander unit 9 and a Phy of the expander unit 9 connected to the expander unit 8 are subtractive Phys. The controller unit 6 and the expander unit 8 exchange data with each other via their wide ports for data storing in each of the storage units 10 to 13 or for data reading from each of the storage units 10 to 13. The controller unit 7 and the expander unit 9 exchange data with each other via their wide ports for data storing in each of the storage units 10 to 13 or for data reading from each of the storage units 10 to 13. Furthermore, the controller unit 6 and the expander unit 8 exchange pieces of environmental information of the storage units 10 to 13, the PSU 141, the PSU 142, the FAN 151, the FAN 152, the TEMP 161, and the TEMP 162. The controller unit 7 and the expander unit 9 similarly exchange pieces of environmental information of the storage units 10 to 13, the PSU 141, the PSU 142, the FAN 151, the FAN 152, the TEMP 161, and the TEMP 162.

Each of the expander unit 8 and the expander unit 9 is connected to the PSU 141, the PSU 142, the FAN 151, the FAN 152, the TEMP 161, and the TEMP 162 using the I2C (Inter Integrated Circuit) communication. In the I2C communication, only two signal lines, a serial data line (SDA) and a serial clock line (SCL), are used as a bus. In the case of general connection based on the I2C communication, a master takes the initiative in communication and each slave responds to a communication request for the master. In this embodiment, the expander unit 8 and the expander unit 9 function as masters, and the PSU 141, the PSU 142, the FAN 151, the FAN 152, the TEMP 161, and the TEMP 162 function as slaves.

Here, each of the expander unit 8 and the expander unit 9 may be connected to a plurality of expander units so as to increase the number of storage units in the storage apparatus 1. In this case, the connections between each of the expander unit 8 and expander unit 9 and these expander units are established in accordance with the SAS protocol. There is redundancy between an expander unit connected to the expander unit 8 and an expander unit connected to the expander unit 9. The connection between these expanders, between which there is redundancy, is established in accordance with the I2C protocol. Detailed description will be made with reference to FIG. 9.

Each of the storage units 10 to 13 has a multiport. The multiport of each of the storage units 10 to 13 is connected to the expander unit 8 and the expander unit 9 between which there is redundancy.

Figure 2:
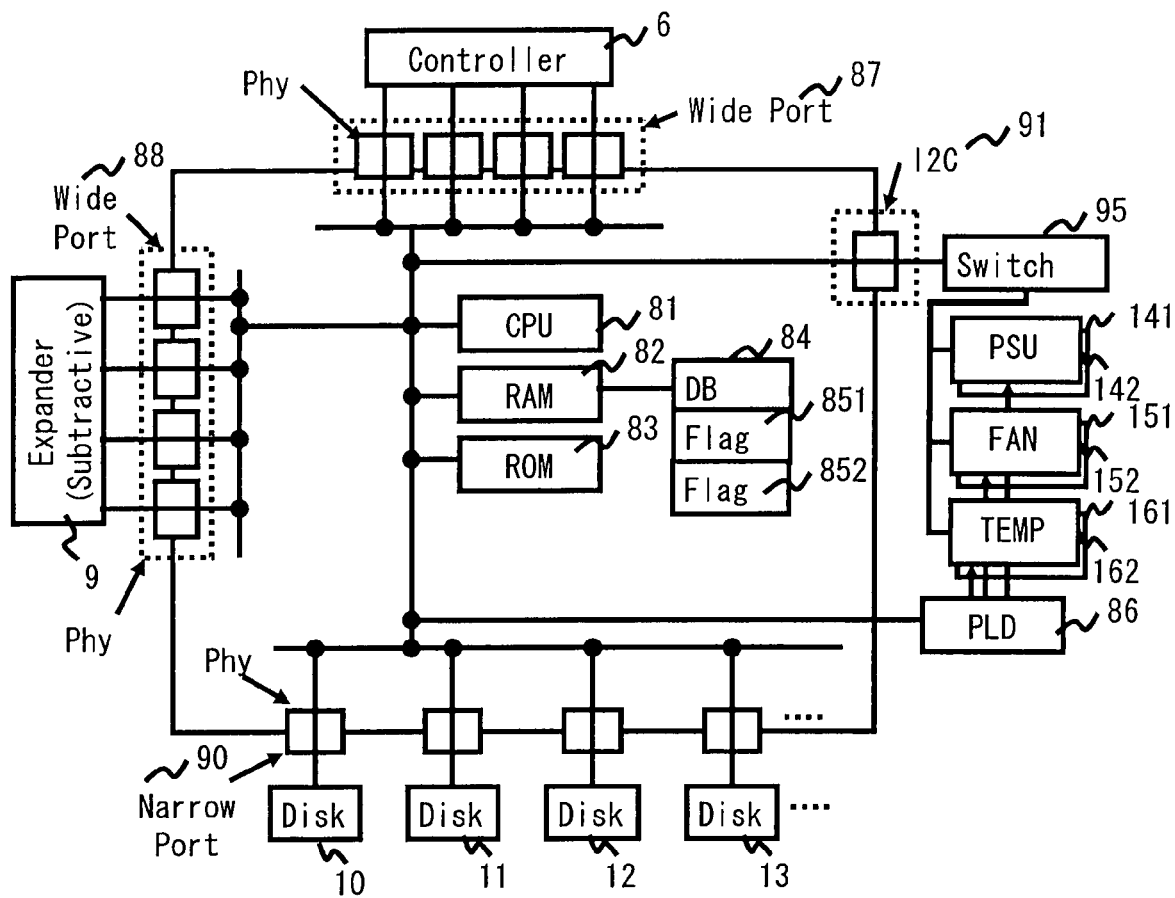
FIG. 2 is a block diagram of an expander unit.

Next, a configuration of an expander unit will be described. FIG. 2 is a block diagram of the expander unit 8. The configurations of the expander unit 8 and the expander unit 9 are the same. Accordingly, here, the configuration of the expander unit 8 will be described. The expander unit 8 includes a CPU 81, a RAM 82, a ROM 83, and a plurality of ports.

The CPU 81 manages all functions of the expander unit 8. The RAM 82 is a storage area for storing a result of processing performed by the CPU 81. The RAM 82 stores an environmental information database (DB) 84 that will be described later with reference to FIG. 4. Furthermore, the RAM 82 stores information about a flag A 851 that denotes whether information about the occurrence of a change in the environmental information stored in the environmental information DB 84 has already been transmitted to the controller unit 6, and stores information about a flag B 852 that denotes whether the expander unit 8 has detected a change in the state of a monitoring target unit in one polling cycle. The ROM 83 is a storage area for storing firmware that is used to cause the CPU 81 to function as the expander unit 8. The CPU 81, the RAM 82, and the ROM 83 are connected to each other via an internal bus, and exchange data or a command with each other. The CPU 81 decompresses the firmware stored on the ROM 83 onto the RAM 82. The CPU 81 functions as executing means for causing the expander unit 8 to execute processes shown in flowcharts of FIGS. 5 to 7.

The ports of the expander unit 8 function as terminals each of which connects units included in the storage apparatus 1. A wide port 87 is connected to the controller unit 6. A wide port 88, which is a subtractive port, is connected to the expander unit 9. Narrow ports 90 are individually connected to the storage units 10 to 13. An I2C port 91 is connected to the PSU 141, PSU 142, the FAN 151, the FAN 152, the TEMP 161, and the TEMP 162 via a switch 95. Thus, if the expander unit 8 is connected to a unit such as the controller unit 6 or the expander unit 9 for which reliability of data transfer must be ensured, a wide port is used for the connection so as to improve safety of data transfer.

A PLD 86 (Programmable Logic Device) is a logic circuit IC in which a designer can form a logic circuit by creating a program. In this embodiment, the PLD 86 transmits a parameter to a monitoring target unit (the PSU 141, the PSU 142, the FAN 151, the FAN 152, the TEMP 161, or the TEMP 162) so as to write the parameter in the register of the monitoring target unit.

The expander unit 8 and the PLD 86 are connected to each other via a local bus. The expander unit 8 transmits to the PLD 86 the address of the register of the PLD 86, data to be written, and control information used to determine whether data is to be written in the register of the PLD 86 or is to be read out from the register of the PLD 86. The PLD 86 is connected to the terminals of the monitoring target units (the PSU 141, the PSU 142, the FAN 151, the FAN 152, the TEMP 161, and the TEMP 162). When data is written in the register of the PLD 86, the PLD 86 transmits the data written in the register thereof to a corresponding monitoring target unit.

Figure 3:
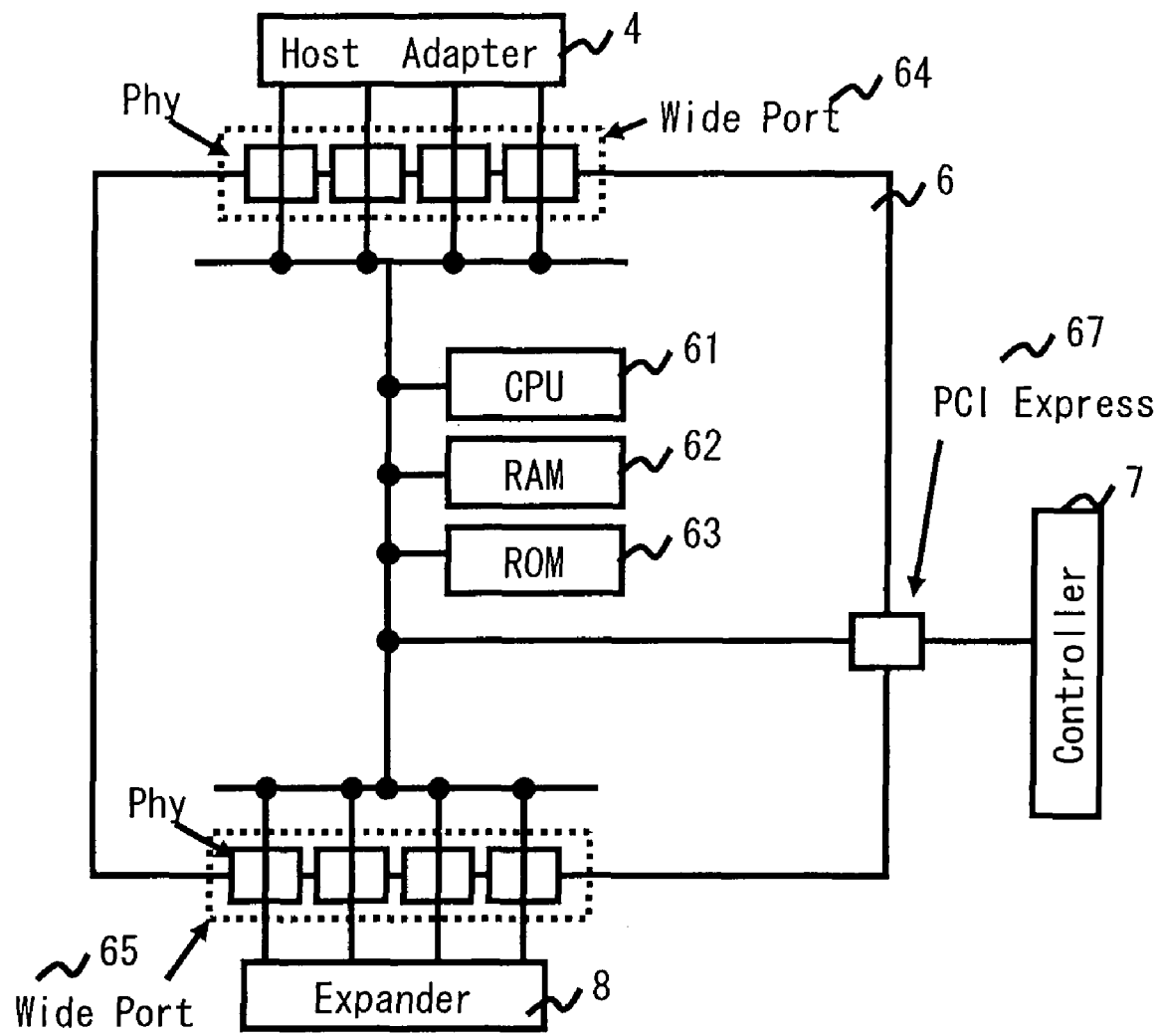
FIG. 3 is a block diagram of a controller unit.

Next, the configurations of the controller unit 6 and the controller unit 7 will be described. FIG. 3 is a block diagram showing the configuration of the controller unit 6. The configurations of the controller unit 6 and the controller unit 7 are the same. Accordingly, here, the configuration of the controller unit 6 will be described. The controller unit 6 includes a CPU 61, a RAM 62, a ROM 63, and a plurality of ports. The CPU 61 manages all functions of the controller unit 6. The RAM 62 is a storage area for storing a result of processing performed by the CPU 61. The ROM 63 is a storage area for storing firmware that is used to cause the CPU 61 to function as a controller. The CPU 61, the RAM 62, and the ROM 63 are connected to each other via an internal bus, and exchange data or a command with each other. The CPU 61 decompresses the firmware stored on the ROM 63 onto the RAM 62. The CPU 61 functions as executing means for causing the controller unit 6 to execute the processes shown in the flowcharts of FIGS. 5 to 7.

The ports of the controller unit 6 function as terminals each of which connects units included in the storage apparatus 1. Each of the ports is composed of a Phy. A wide port 64 is connected to the host adapter unit 4. A wide port 65 is connected to the expander unit 8. A PCI Express port 67 is connected to the controller unit 7 in accordance with the PCI Express standard.

Next, the configurations of the PSU 141 and the PSU 142 will be described. Each of the PSU 141 and the PSU 142 has an I2C port for outputting a value in response to an environmental information acquisition request transmitted via the switch 95.

Next, the configurations of the FAN 151 and the FAN 152 will be described. Each of the FAN 151 and the FAN 152 has a RAM used to set the number of rotations of a fan, a fan that rotates in accordance with a setting value, and an I2C port for outputting a value in response to an environmental information acquisition request transmitted via the switch 95.

Next, the configurations of the TEMP 161 and the TEMP 162 will be described. Each of the TEMP 161 and the TEMP 162 has a temperature sensor for acquiring the temperature of the storage apparatus 1 and an I2C port for outputting a value in response to an environmental information acquisition request transmitted via the switch 95.

Figure 4:
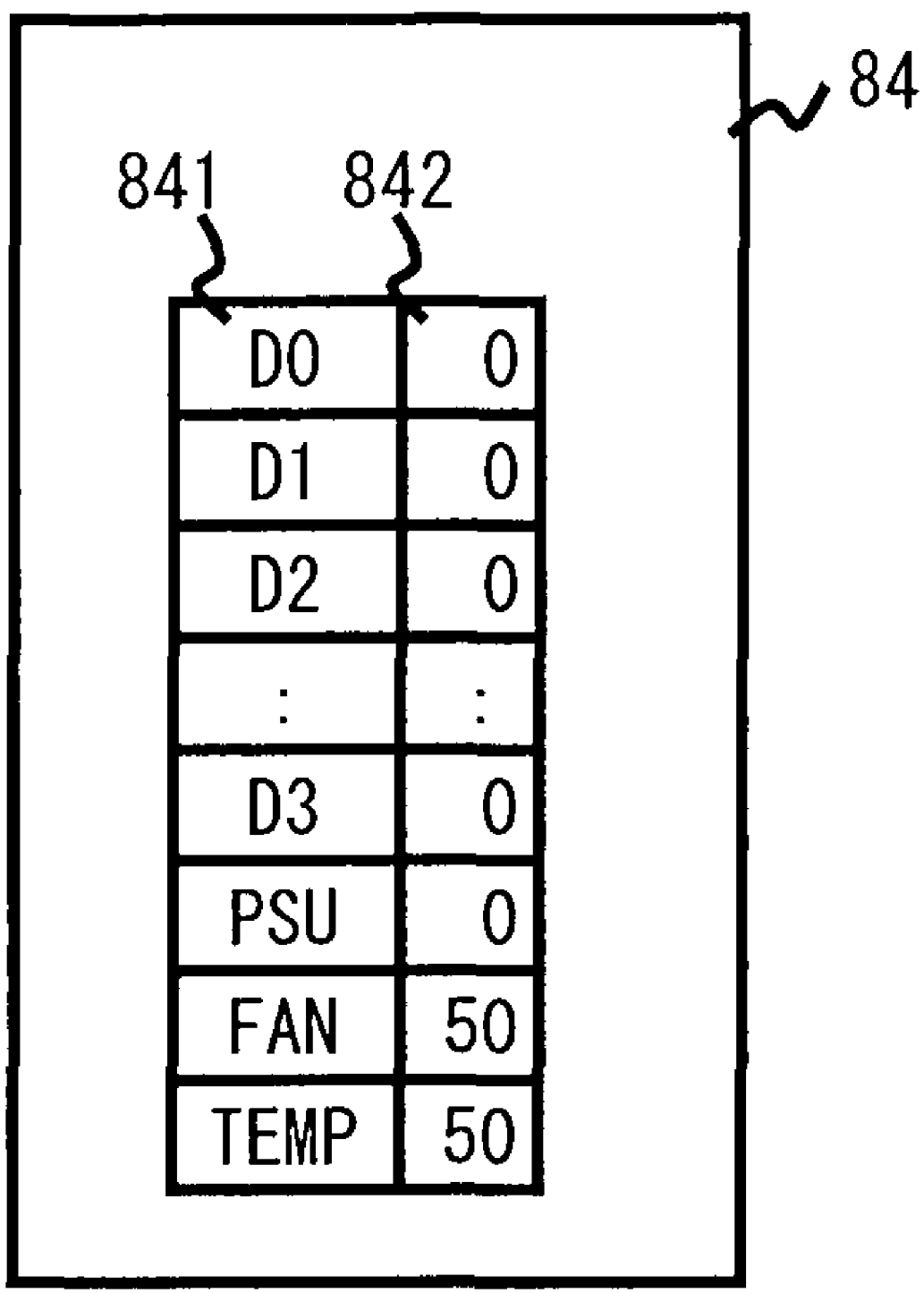
FIG. 4 is a diagram describing an environmental information database (DB) included in an expander unit.

FIG. 4 is a diagram describing the environmental information DB 84 included in the expander unit 8. The configurations of the expander unit 8 and the expander unit 9 are the same. Accordingly, here, the environmental information DB 84 included in the expander unit 8 will be described. The environmental information DB 84 is a database for individually associating pieces of environmental information 842 acquired from environmental information acquisition target units 841 with the corresponding environmental information acquisition target units 841 and storing them. The expander unit 8 stores the latest environmental information acquired from each monitoring target unit in the environmental information DB 84.

In this embodiment, only the latest environmental information acquired from each monitoring target unit is stored in the environmental information DB 84 so as to prevent the use of a large storage area of the RAM 82 included in the expander unit 8. Accordingly, even if there is a change from the environmental information of a certain monitoring target unit which has been previously obtained by the expander unit 8 to the latest environmental information of the monitoring target unit, the controller unit 6 does not detect a change in the state of the monitoring target unit when a value representing the latest environmental information falls within a predetermined range. On the other hand, if the expander unit 8 has a large storage area for the environmental information DB 84, or if the controller unit 6 or the controller unit 7 needs to know a unit whose environmental information has been changed with certainty, the environmental information DB 84 may store environmental information history.

Figure 5:
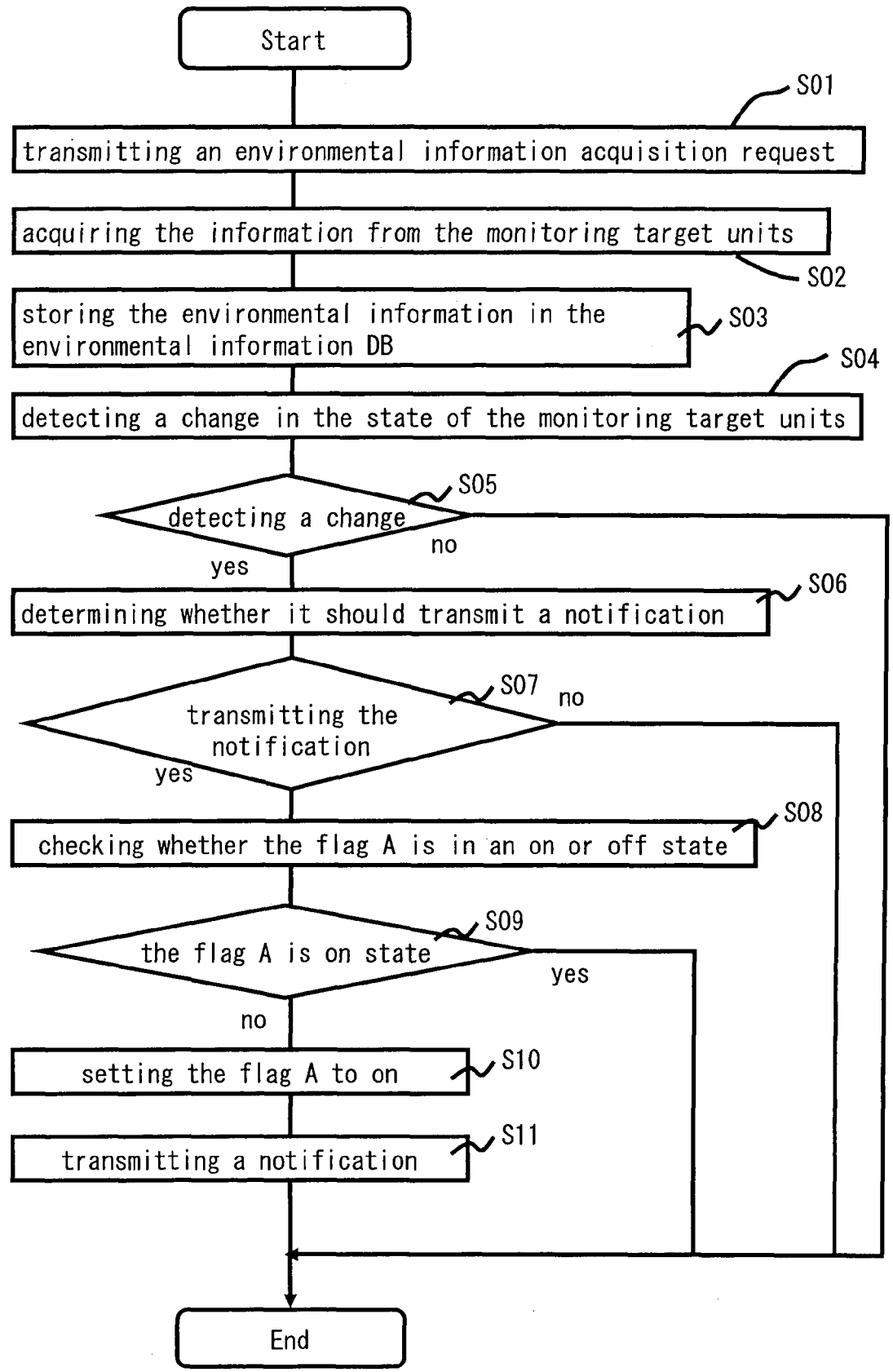
FIG. 5 is a flowchart showing a process of acquiring environmental information of each unit and transmitting a notification that environmental information has been changed which is performed by an expander unit.

FIG. 5 is a flowchart showing a process of acquiring environmental information of each unit which is performed by the expander unit 8. The configurations of the expander unit 8 and the expander unit 9 are the same. Accordingly, here, an environmental information acquisition process performed by the expander unit 8 will be described. The expander unit 8 transmits an environmental information acquisition request to each of monitoring target units (the PSU 141, the PSU 142, the FAN 151, the FAN 152, the TEMP 161, and the TEMP 162) (step S01). For example, the expander unit 8 periodically transmits the environmental information acquisition request to each of the monitoring target units. Upon receiving the environmental information acquisition request from the expander unit 8 via the switch 95, each of the monitoring target units (the PSU 141, the PSU 142, the FAN 151, the FAN 152, the TEMP 161, and the TEMP 162) outputs a value representing the present environmental information thereof stored in its register to a port.

If the monitoring target units are the storage units 10 to 13 capable of transmitting environmental information, each of the storage units 10 to 13 transmits the environmental information thereof to the expander unit 8 and the expander unit 9 using the SCSI protocol.

The expander unit 8 acquires the environmental information output from each of the monitoring target units (step S02). Subsequently, the expander unit 8 stores the environmental information acquired from each of the monitoring target units in the environmental information DB 84 (step S03).

The expander unit 8 detects a change in the state of each of the monitoring target units on the basis of the environmental information acquired from each of the monitoring target units (step S04). For example, the change in the state of a monitoring target unit is detected by determining whether a value representing the acquired environmental information of the monitoring target unit falls within a predetermined value range. If the value representing the environmental information of the monitoring target unit falls outside the predetermined value range, the expander unit 8 determines that the environmental information of the monitoring target unit has changed, that is, that the state of the monitoring target unit has changed. If there is no response from a certain monitoring target unit after a predetermined time has elapsed, the expander unit 8 determines that the state of the monitoring target unit has changed, because there is a possibility that a physical link between the expander unit 8 and the monitoring target unit is broken.

If the expander unit 8 determines that there is no change in the environmental information acquired from each of the monitoring target units (No in step S05), the expander unit 8 ends the process. For example, if the next environmental information acquisition time comes, the expander unit 8 starts the process from step S01 again. On the other hand, if the expander unit 8 detects a change in the state of a certain monitoring target unit (Yes in step S05), the expander unit 8 determines whether it should transmit a notification about the change to the controller unit 6 (step S06). For example, if it is determined that the temperature of the storage apparatus 1 is higher than a predetermined temperature on the basis of temperature information which the expander unit 8 has acquired from the TEMP 161, the expander unit 8 can transmit a command for increasing the number of rotations of a fan to the FAN 151. Alternatively, if it is determined that the temperature of the storage apparatus 1 is lower than a predetermined temperature on the basis of the temperature information which the expander unit 8 has acquired from the TEMP 161, the expander unit 8 can transmit a command for reducing the number of rotations of a fan or a command for stopping rotation to the FAN 151. The above-described cases do not correspond to serious failures of a monitoring target unit. Accordingly, the expander unit 8 is not required to transmit a notification about a change in the state of the monitoring target unit to the controller unit 6. Accordingly, in this embodiment, the controller unit 6 is not notified of a predetermined change in environmental information. Consequently, there can be provided the storage apparatus 1 capable of reducing the amount of exchange of environmental information between the controller unit 6 and the expander unit 8.

If the expander unit 8 determines that it is not required to transmit the notification about the change in the environmental information of the corresponding monitoring target unit (No in step S07), the process ends. At that time, the expander unit 8 performs processing corresponding to the change in the environmental information upon the monitoring target unit. For example, the expander unit 8 controls the number of rotations of a fan included in the FAN 151 on the basis of temperature information acquired from the TEMP 161 included in the storage apparatus 1. In this case, the expander unit 8 has, in advance, a database for associating the acquired environmental information of a certain monitoring target unit with a control parameter corresponding to a value representing the acquired environmental information and storing them.

If the expander unit 8 determines that it should transmit the notification about the environmental information change to the controller unit 6 (Yes in step S07), the expander unit 8 checks whether the flag A 851 stored in the RAM 82 thereof is in an on or off state (step S08). The flag A 851 is used to determine whether the expander unit 8 should transmit a notification about an environmental information change to the controller unit 6.

If the flag A 851 is in the on state (Yes in step S09), that means that the expander unit 8 has already transmitted the notification about an environmental information change to the controller unit 6. Accordingly, the expander unit 8 ends the process without newly transmitting a notification about an environmental information change. The reason why the expander unit 8 ends the process without newly transmitting a notification about an environmental information change when the flag A 851 is in the on state is because the controller unit 6 accesses the environmental information DB 84 included in the expander unit 8 on the basis of the notification about an environmental information change which has been previously transmitted from the expander unit 8. Thus, the number of exchanges of environmental information between the expander unit 8 and the controller unit 6 can be reduced.

On the other hand, if the flag A 851 is in the off state (No in step S09), that means that the expander unit 8 has not yet transmitted a notification that environmental information has been changed to the controller unit 6. Accordingly, the expander unit 8 sets the flag A 851 to on (step S10), and transmits a notification that environmental information has been changed to the controller unit 6 (step S11). The notification that environmental information has been changed which is transmitted from the expander unit 8 to the controller unit 6 in step S11 is referred to as a broadcast. The broadcast is not a command for the controller unit 6, and is a primitive. The primitive is null data that does not include a parameter. More specifically, a primitive is composed of a four-byte frame. The first byte of a primitive has a value specified by the SAS or SATA protocol, and each of the other three bytes is used to identify an event. An expander transmits a broadcast to another expander and a controller, which are connected to the expander in accordance with the SAS protocol, so as to notify that environmental information has been changed. However, the another expander does not transmit the broadcast received via a subtractive Phy to another unit. In this embodiment, the subtractive Phy of the expander unit 8 and the subtractive Phy of the expander unit 9 are connected to each other. Accordingly, the expander unit 9 does not transmit the broadcast received from the expander unit 8 to another unit. Similarly, the expander unit 8 does not transmit a broadcast received from the expander unit 9 to another unit.

Figure 6:
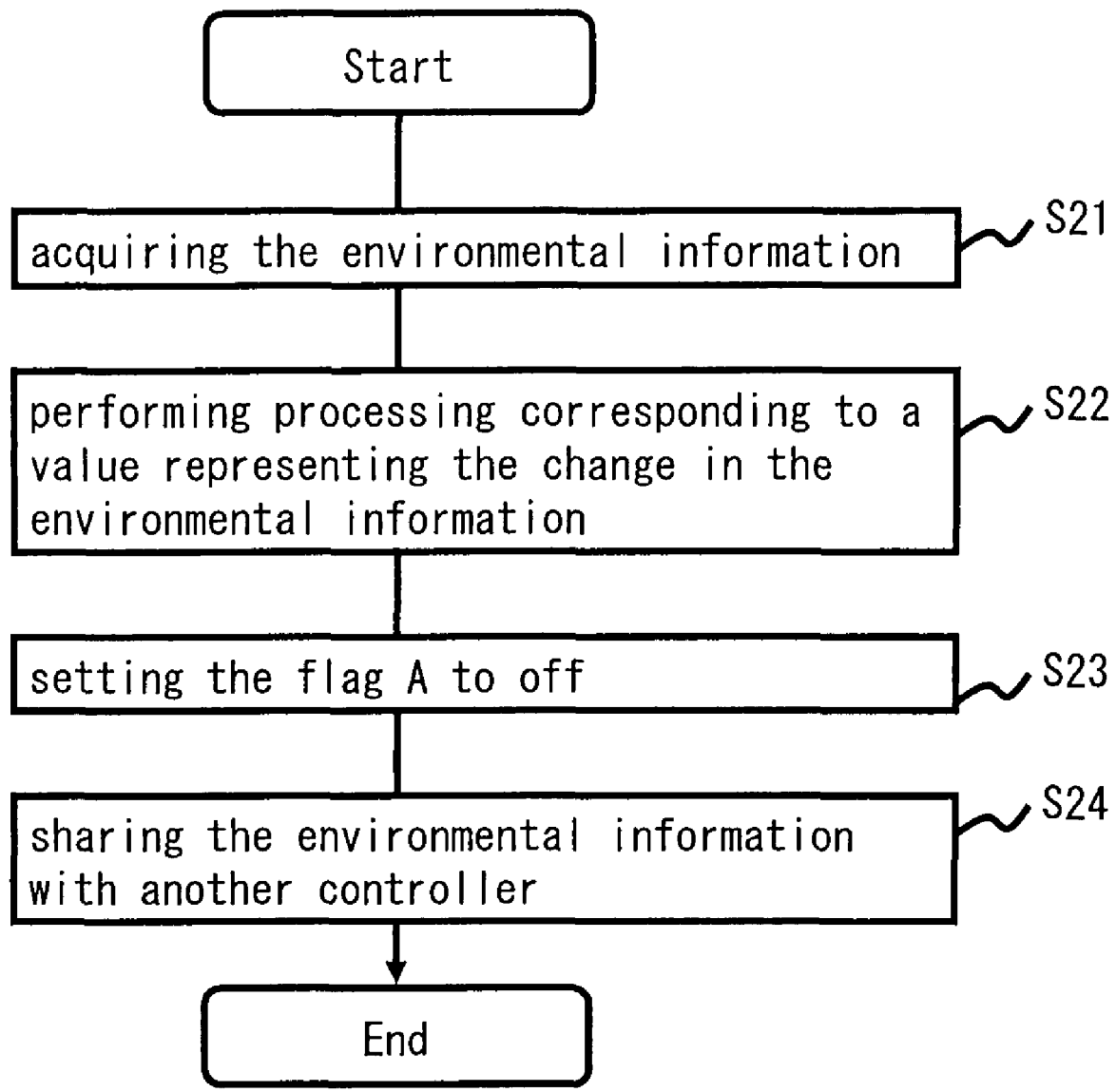
FIG. 6 is a flowchart showing a process which a controller unit performs after receiving from an expander unit a broadcast that is information representing that environmental information has been changed.

FIG. 6 is a flowchart showing a process which the controller unit 6 performs after receiving a broadcast that is information representing that environmental information has been changed from the expander unit 8. Upon receiving information representing that the environmental information of a certain monitoring target unit has been changed from the expander unit 8, the controller unit 6 accesses the environmental information DB 84. The controller unit 6 acquires the environmental information DB 84 included in the expander unit 8 (step S21). The controller unit 6 performs processing corresponding to a value representing the change in the environmental information of the monitoring target unit (step S22). The controller unit 6 has, in advance, pieces of information each corresponding to a value representing the amount of change in environmental information. For example, in accordance with a value representing the amount of change in environmental information, the controller unit 6 notifies an administrator for the storage apparatus 1 of a unit corresponding to the value via the host computer 2 or the host computer 3. Alternatively, the controller unit 6 warns the administrator for the storage apparatus 1 of the change in the state of a corresponding unit and removes the corresponding unit from the storage apparatus 1.

Upon acquiring the environmental information DB 84, the controller unit 6 outputs an instruction for setting the flag A 851 to off to the expander unit 8 (step S23). The expander unit 8 sets the flag A 851 stored in the RAM 82 thereof to off in response to the instruction transmitted from the controller unit 6. Accordingly, if the expander unit 8 detects a change in environmental information after the flag A 851 has been set to off, it is determined in step S09 shown in FIG. 5 that the flag A 851 is in the off state (No in step S09). Accordingly, the expander unit 8 notifies the controller unit 6 of information representing that environmental information has been changed. The expander unit 8 may be configured to set the flag A 851 to off after the controller unit 6 has received a command for acquiring the environmental information DB 84. This eliminates the need for exchanging the command for setting the flag A 851 to off between the controller unit 6 and the expander unit 8. Consequently, the number of exchanges of environmental information between the expander unit 8 and the controller unit 6 is smaller than that of the case in which a broadcast is transmitted to the controller unit 6 each time the change in environmental information is detected.

The controller unit 6 causes the controller unit 7 to share the environmental information DB 84 acquired from the expander unit 8 (step S24). Consequently, when one of the expanders between which there is redundancy cannot detect a change in the environmental information of a certain monitoring target unit, if the other one of the expanders detects the change, both of controllers between which there is redundancy can identify the change.

Next, a case in which an expander unit acquires environmental information by performing polling will be described.

Figure 7:
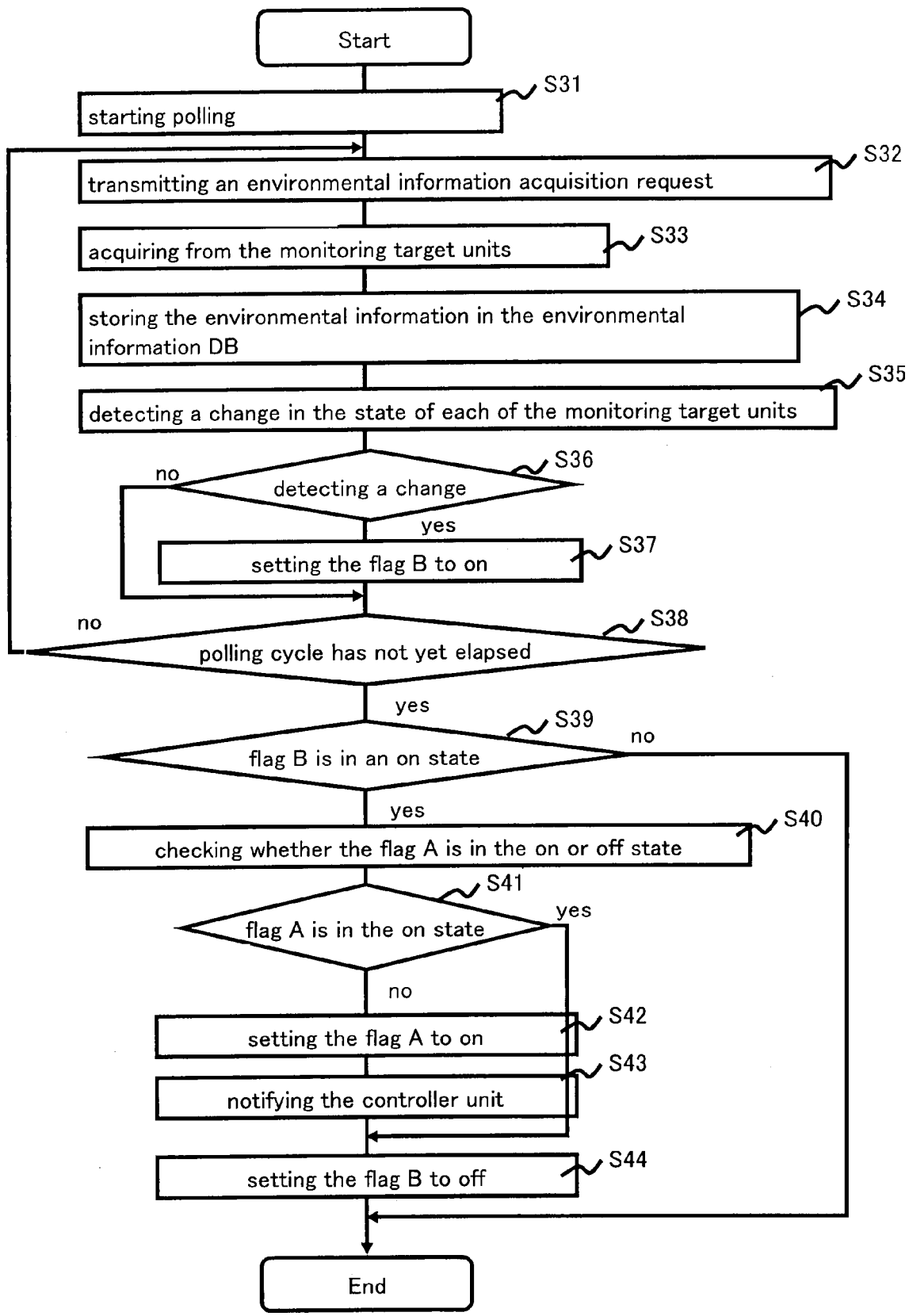
FIG. 7 is a flowchart showing a process of acquiring environmental information of each unit by performing polling which is performed by an expander unit.

The configurations of the expander unit 8 and the expander unit 9 are the same. Accordingly, here, a process performed by the expander unit 8 will be described. Polling means detection processing in which the expander unit 8 acquires pieces of environmental information from connection destinations of all ports thereof in accordance with a predetermined order. FIG. 7 is a flowchart showing a process of acquiring environmental information of each unit by performing polling which is performed by the expander unit 8. In the flowchart shown in FIG. 7, the expander unit 8 uses the flag B 852 that is a flag used to determine whether there is a monitoring target unit whose state change has been detected in one polling cycle. In one polling cycle, detection processing is performed upon all monitoring target units. For example, if the expander unit 8 detects a change in the state of a certain monitoring target unit on the basis of the environmental information acquired from the monitoring target unit, the expander unit 8 sets the flag B 852 to on.

The expander unit 8 starts polling at regular intervals (step S31). The expander unit 8 transmits an environmental information acquisition request to each of monitoring target units (the PSU 141, the PSU 142, the FAN 151, the FAN 152, the TEMP 161, and the TEMP 162) (step S32). The expander unit 8 acquires environmental information output from each of the monitoring target units (step S33). The expander unit 8 stores the environmental information acquired from each of the monitoring target units in the environmental information DB 84 (step S34). The expander unit 8 detects a change in the state of each of the monitoring target units on the basis of the environmental information acquired from each of the monitoring target units (step S35).

If the expander unit 8 detects a change in the state of a certain monitoring target unit (Yes in step S36), the expander unit 8 sets the flag B 852 to on (step S37). If the one polling cycle has not yet elapsed (No in step S38), the expander unit 8 repeats the process from step S32 until the one polling cycle has elapsed. On the other hand, if the one polling cycle has elapsed (Yes in step S38), the expander unit 8 checks the flag B 852 (step S39). If the flag B 852 is in an on state at that time, that means that the expander unit 8 has acquired from at least one or more monitoring target units connected thereto a response indicating that the state of a corresponding monitoring target unit has been changed.

If the flag B 852 is in the on state (Yes in step S39), the expander unit 8 checks whether the flag A 851 is in the on or off state (step S40). If the flag A 851 is in the on state (Yes in step S41), the expander unit 8 ends the process without notifying the controller unit 6 of information representing that the environmental information of a corresponding monitoring target unit has been changed. On the other hand, if the flag A 851 is in the off state (No in step S41), the expander unit 8 sets the flag A 851 to on (step S42) and notifies the controller unit 6 of the information representing that the environmental information of the corresponding monitoring target unit has been changed (step S43). Subsequently, the expander unit 8 sets the flag B 852 to off (step S44), and performs the process from step S31 when the next polling cycle is started.

The expander unit 8 does not transmit information representing that the environmental information of a certain monitoring target unit has been changed to the controller unit 6 during polling. After the polling has been completed, the expander unit 8 transmits a broadcast that is information representing that the environmental information of a certain monitoring target unit has been changed to the controller unit 6. Consequently, the number of data exchanges between the expander unit 8 and the controller unit 6 can be further reduced. For example, it is assumed that the expander unit 8 detects a change in the environmental information of a first monitoring target unit in a first polling cycle. The expander unit 8 transmits a broadcast that is information representing that the environmental information has been changed to the controller unit 6. The controller unit 6 accesses the expander unit 8 on the basis of the received information. Subsequently, the flag A 851 is set to off. Here, if the expander unit 8 detects a change in the environmental information of a second monitoring target unit in the first polling cycle, the expander unit 8 transmits a broadcast to the controller unit 6 again. However, since the time required for one polling cycle is short, it is not required that data exchange between the controller unit 6 and the expander unit 8 be performed on a monitoring target unit-by-monitoring target unit basis. Accordingly, even if the expander unit 8 detects changes in the environmental information of a plurality of monitoring target units in one polling cycle, the expander unit 8 can notify the controller unit 6 of the detection results by transmitting a broadcast to the controller unit 6 only once. Consequently, the number of exchanges of environmental information between the controller unit 6 and the expander unit 8 can be reduced.

Figure 8:
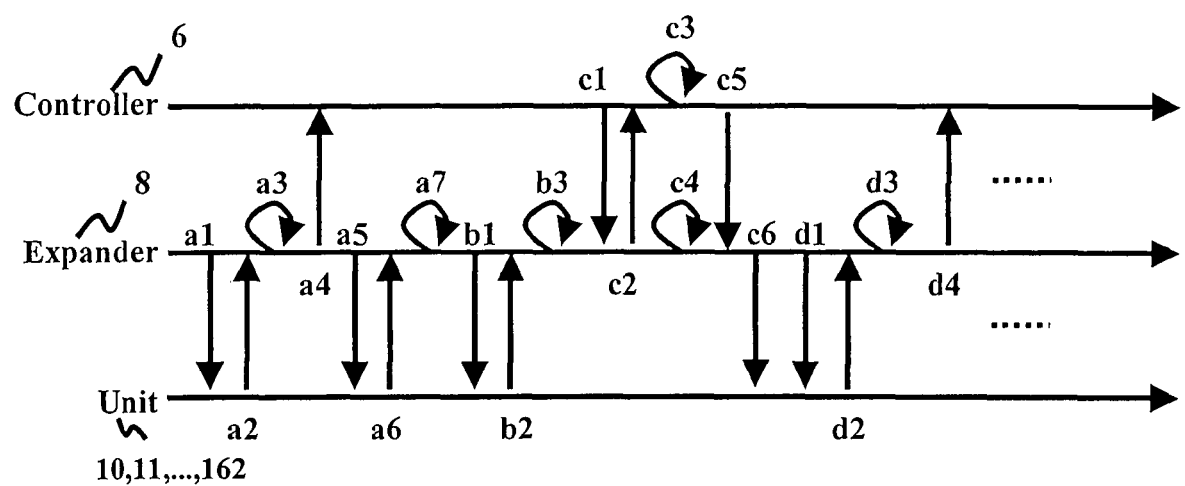
FIG. 8 is a diagram showing a time series model of processing for transferring environmental information among an expander unit, a controller unit, and monitoring target units.

FIG. 8 is a diagram showing a time series model of processing for transferring environmental information among the expander unit 8, the controller unit 6, and monitoring target units. In FIG. 8, a horizontal direction denotes the time passage in each of the expander unit 8, the controller unit 6, and monitoring target units, and a vertical direction denotes the transfer of environmental information among the expander unit 8, the controller unit 6, and the monitoring target units.

The expander unit 8 transfers an environmental information acquisition request to a unit a (a1). The unit a transfers the environmental information thereof to the expander unit 8 (a2). The expander unit 8 updates the environmental information DB 84 using the acquired environmental information. Subsequently, the expander unit 8 determines whether there is a change from the previously acquired environmental information of the unit a to the latest environmental information of the unit a (a3). If there is a change, the expander unit 8 checks the flag A 851. If the flag A 851 is in the off state, the expander unit 8 transfers a notification about the change in the environmental information to the controller unit 6 (a4). Subsequently, the expander unit 8 sets the flag A 851 to on.

The expander unit 8 transfers an environmental information acquisition request to the unit a (a5). The unit a transfers the environmental information thereof to the expander unit 8 (a6). The expander unit 8 updates the environmental information DB 84 using the acquired environmental information. Subsequently, the expander unit 8 determines whether the amount of change between the previously acquired environmental information of the unit a and the latest environmental information of the unit a is equal to or larger than a predetermined threshold value (a7). The threshold value is set by a designer. If the amount of change in the environmental information is equal to or larger than the threshold value, the expander unit 8 checks the flag A 851. Here, since the expander unit 8 has already transmitted the notification about the change in environmental information to the controller unit 6 in a4, the flag A 851 is in the on state. Accordingly, the expander unit 8 does not transmit a notification about the change in environmental information to the controller unit 6.

Subsequently, the expander unit 8 transfers an environmental information acquisition request to another monitoring target unit b included in the storage apparatus 1 (b1). The unit b transfers the environmental information thereof to the expander unit 8 (b2). The expander unit 8 updates the environmental information DB 84 using the acquired environmental information. Subsequently, the expander unit 8 determines whether the amount of change between the previously acquired environmental information of the unit b and the latest environmental information of the unit b is equal to or larger than a predetermined threshold value (b3). The threshold value is set by a designer. If the amount of change in the environmental information is equal to or larger than the threshold value, the expander unit 8 checks the flag A 851. Here, the expander unit 8 has already transmitted the notification about the change in environmental information to the controller unit 6 in a4. Accordingly, the expander unit 8 checks that the flag A 851 is in the on state, and does not transmit a notification about the change in environmental information to the controller unit 6.

Subsequently, the controller unit 6 accesses the environmental information DB 84 on the basis of the notification about the change in environmental information which has been acquired from the expander unit 8 in a4 (c1). The controller unit 6 acquires the environmental information DB 84 (c2), extracts the monitoring target unit whose environmental information has been changed, and performs processing corresponding to the change (c3). If the expander unit 8 checks that the controller unit 6 has accessed the environmental information DB 84, the expander unit 8 sets the flag A 851 to off (c4). On the other hand, the controller unit 6 transmits the result of processing performed in c3 via the expander unit 8 (c5) to the corresponding monitoring target unit (c6).

Subsequently, the expander unit 8 transfers an environmental information acquisition request to another monitoring target unit d included in the storage apparatus 1 (d1). The unit d transfers the environmental information thereof to the expander unit 8 (d2). The expander unit 8 updates the environmental information DB 84 using the acquired environmental information. Subsequently, the expander unit 8 determines whether the amount of change between the previously acquired environmental information of the unit d and the latest environmental information of the unit d is equal to or larger than a predetermined threshold value (d3). The threshold value is set by a designer. If the amount of change in the environmental information is equal to or larger than the threshold value, the expander unit 8 checks the flag A 851. If the flag A 851 is in the off state, the expander unit 8 transfers a notification about the change in environmental information to the controller unit 6 (d4). Subsequently, the expander unit 8 sets the flag A 851 to on.

Figure 9:
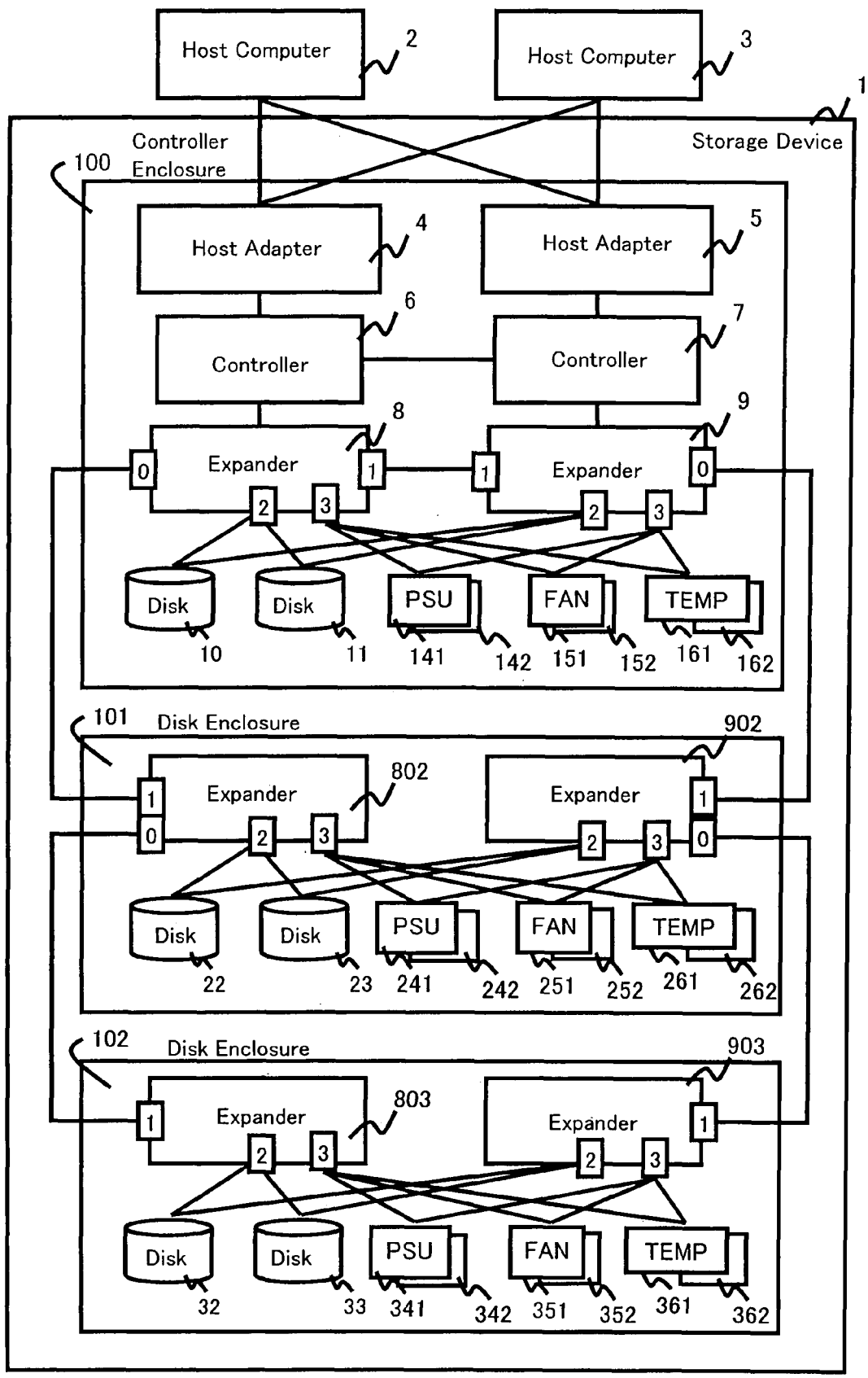
FIG. 9 is a block diagram of a storage apparatus in which a plurality of expanders are connected.

Next, processing performed in a case in which a plurality of expanders are connected will be described. FIG. 9 is a block diagram of the storage apparatus 1 in which a plurality of expanders are connected.

The storage apparatus 1 stores data in storage units included therein using controllers. The controllers are included in a CE (Controller Enclosure) 100. The storage apparatus 1 can increase the storage capacity thereof by adding a storage unit. Each of a DE (Device Enclosure) 101 and a DE (Device Enclosure) 102, which are cabinets used to add storage units, does not include a controller, and includes monitoring target units such as expander units, storage units, PSUs, FANs, and TEMPs.

The expander units included in the storage apparatus 1 shown in FIG. 9 are connected as follows. There is redundancy between the expander unit 8 and the expander unit 9 which are connected to each other in accordance with the SAS protocol. Ports 1 of the expander unit 8 and the expander unit 9 are each composed of a subtractive Phy. There is redundancy between an expander unit 802 and an expander unit 902 which are connected to each other in accordance with the I2C protocol. More specifically, two I2C units are connected, and both of them function as master units. There is redundancy between an expander unit 803 and an expander unit 903 which are connected to each other in accordance with the I2C protocol. More specifically, two I2C units are connected, and both of them function as master units.

A port 0 of the expander unit 8 included in the CE 100 is connected to a port 1 of the expander unit 802 included in the DE 101. A port 0 of the expander unit 9 included in the CE 100 is connected to a port 1 of the expander unit 902 included in the DE 101. A port 0 of the expander unit 802 included in the DE 101 is connected to a port 1 of the expander unit 803 included in the DE 102. A port 0 of the expander unit 902 included in the DE 101 is connected to a port 1 of the expander unit 903 included in the DE 102.

In the case of the connection between the expander unit 8 and the expander unit 802, the port 0 of the expander unit 8 is composed of a general Phy. Accordingly, the expander unit 8 can know a unit connected to the expander unit 802 connected to the port 0 of the expander unit 8. On the other hand, the port 1 of the expander unit 802 is composed of a subtractive Phy. Accordingly, the expander unit 802 cannot know a unit connected to the expander unit 8. The relationship between the expander unit 9 included in the CE 100 and the expander unit 902 included in the DE 101 is the same as that between the expander unit 8 and the expander unit 802.

In the case of the connection between the expander unit 802 and the expander unit 803, the port 0 of the expander unit 802 is composed of a general Phy. Accordingly, the expander unit 802 can know units connected to a port 2 of the expander unit 803. On the other hand, the port 1 of the expander unit 803 is composed of a subtractive Phy. Accordingly, the expander unit 803 cannot know a unit connected to the expander unit 802. The relationship between the expander unit 902 included in the DE 101 and the expander unit 903 included in the DE 102 is the same as that between the expander unit 802 and the expander unit 803.

A Disk 22, a Disk 23, a PSU 241, a PSU 242, a FAN 251, a FAN 252, a TEMP 261, and a TEMP 262, which are included in the DE 101, are monitoring target units each connected to the expander unit 802 and the expander unit 902, which are included in the DE 101.

A Disk 32, a Disk 33, a PSU 341, a PSU 342, a FAN 351, a FAN 352, a TEMP 361, and a TEMP 362, which are included in the DE 102, are monitoring target units each connected to the expander unit 803 and the expander unit 903, which are included in the DE 102. There is redundancy between the expander unit 803 and the expander unit 903.

In FIG. 9, the same reference numerals are used for units having the same functions as those of FIG. 1, and the description thereof will be therefore omitted.

Figure 10:
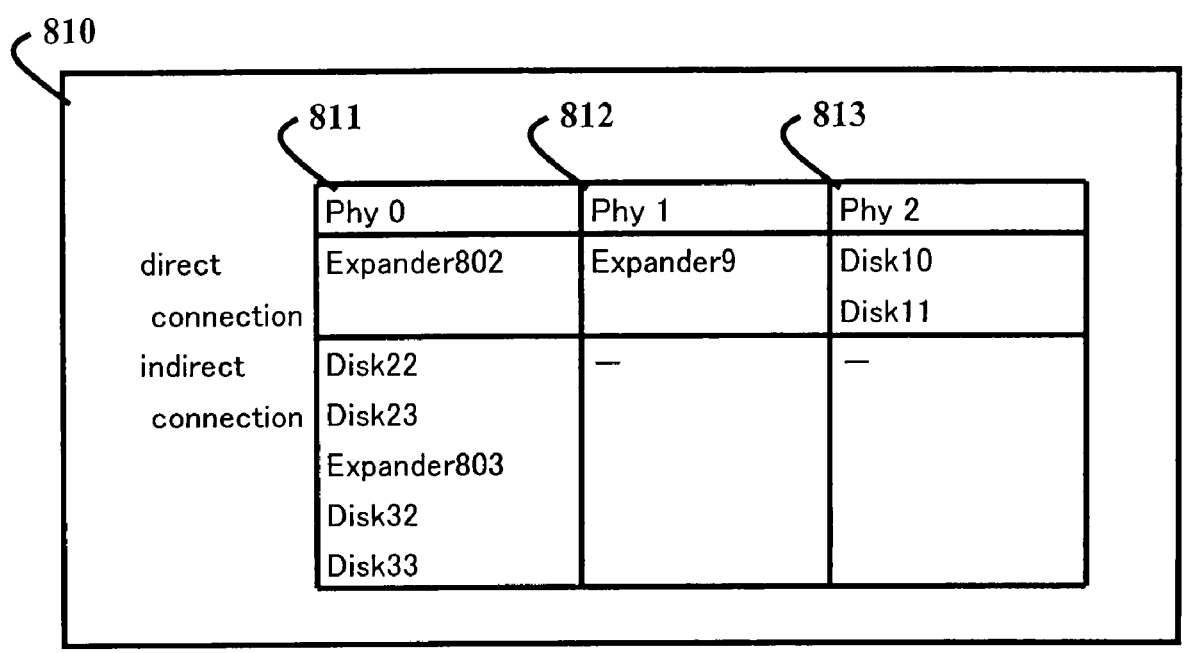
FIG. 10 is a diagram showing a connection table included in an expander unit.

Each of the above-described expanders has a table for managing the addresses of connection destinations of Phys thereof. A connection table 810 which the expander unit 8 has will be described with reference to FIG. 10. A connection destination 811 denotes connection destinations of a Phy 0 in the connection table 810. The expander unit 8 stores information on the expander unit 802 as information on a direct connection destination. The expander unit 802 is connected to the expander unit 803, and the expander unit 803 is connected to the Disk 32 and the Disk 33. The expander unit 802 is directly connected to the Disk 22 and the Disk 23. These units are managed as indirect connection destinations of the Phy 0 of the expander unit 8. A connection destination 812 denotes a connection destination of a Phy 1 in the connection table 810. In the case of the Phy 1 that is a subtractive Phy, only information on a direct connection destination is stored, and information on an indirect connection destination is not acquired. Accordingly, the connection destination 812 includes only information on a direct connection destination. A connection destination 813 denotes connection destinations of a Phy 2 in the connection table 810. The expander unit 8 is directly connected to the storage unit (Disk) 10 and the storage unit (Disk) 11. Accordingly, pieces of information on the storage unit (Disk) 10 and the storage unit (Disk) 11 are stored as pieces of information on direct connection destinations of the Phy 2.

Figure 11:
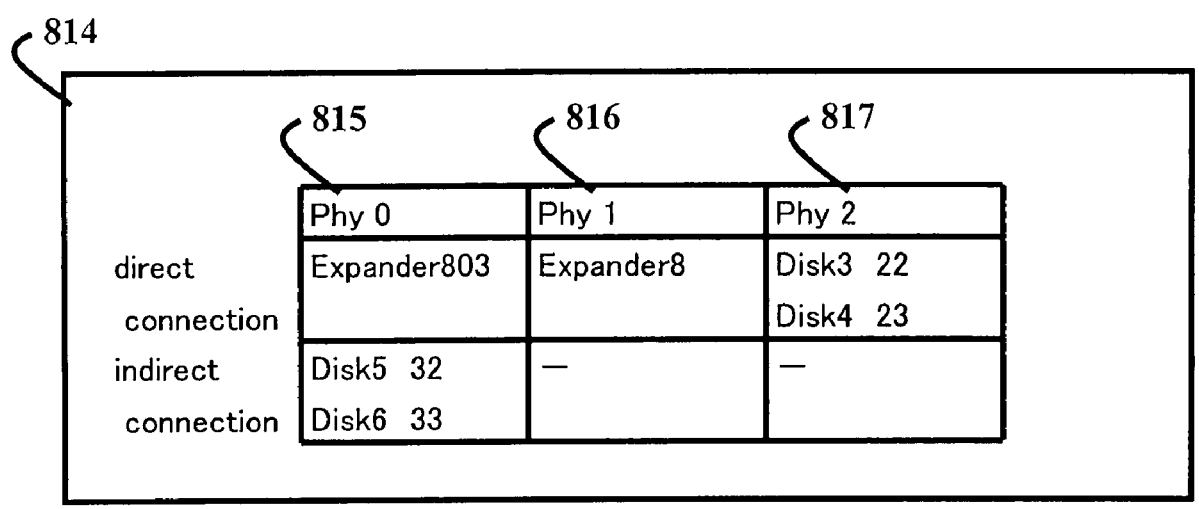
FIG. 11 is a diagram showing a connection table included in an expander unit.

A connection table 814 which the expander unit 802 has will be described with reference to FIG. 11. A connection destination 815 denotes connection destinations of a Phy 0 in the connection table 814. The expander unit 802 stores information on the expander unit 803 as information on a direct connection destination. The expander unit 803 is connected to the Disk 32 and the Disk 33. These units are managed as indirect connection destinations of the Phy 0 of the expander unit 802. A connection destination 816 denotes a connection destination of a Phy 1 in the connection table 814. In the case of the Phy 1 that is a subtractive Phy, only information on a direct connection destination is stored, and information on an indirect connection destination is not acquired. Accordingly, the connection destination 816 includes only information on a direct connection destination. A connection destination 817 denotes connection destinations of a Phy 2 in the connection table 814. The expander unit 802 is directly connected to the Disk 22 and the Disk 23. Accordingly, pieces of information on the Disk 22 and the Disk 23 are stored as pieces of information on direct connection destinations.

For example, in FIG. 9, it is assumed that the environmental state of the FAN 351 has been changed. The expander unit 803 transmits a broadcast that is information representing that the environmental information of a corresponding monitoring target unit has been changed to the expander unit 802 that is connected thereto in accordance with the SAS protocol. Since the expander unit 803 and the expander unit 903 are connected to each other in accordance with the I2C protocol, the expander unit 803 does not transmit the broadcast to the expander unit 903.

Upon receiving the broadcast from the expander unit 803, the expander unit 802 transmits a broadcast to the expander unit 8 that is connected thereto in accordance with the SAS protocol.

Upon receiving the broadcast from the expander unit 802, the expander unit 8 transmits a broadcast to the controller unit 6 that is connected thereto in accordance with the SAS protocol.

On the other hand, since the expander unit 8 and the expander unit 9 are connected to each other using their subtractive Phys, the broadcast output from the expander unit 8 is not transferred to other units connected to the expander unit 9. Consequently, the number of exchanges of environmental information between expanders can be reduced. In addition, when one of expanders between which there is redundancy cannot identify the environmental information of a certain unit, if the other one of the expanders can identify the environmental information of the unit, both of controllers can detect the environmental information of the unit since the controllers share the environmental information.

By performing the above-described transfer method, the amount of transfer of environmental information between the controller unit 6 and the controller unit 7 and the amount of transfer of environmental information between the expander unit 8 and expander unit 9 can be reduced as compared with that between the expander unit 8 and each of monitoring target units and that between the expander unit 9 and each of monitoring target units.

What is claimed is:

1. A storage apparatus having a plurality of storage units for storing data, comprising:
    a plurality of detecting modules that each detect status information indicative of the operation environment, including abnormal states of at least one of voltage value information, a number of fan rotations, and a temperature related to said storage apparatus;
    a controlling module configured to access said stored data in said plurality of storage units, said controlling module performing processing in accordance with said status information; and
    a relaying module connected to said plurality of detecting modules and said controlling module and configured to relay said stored data between said controlling module and said plurality of storage units and to relay said status information between said controlling module and said plurality of detecting modules, said relaying module being further configured to store the status information detected by said plurality of detecting modules, to set and store, within the relaying module, flag information indicating whether the relaying module has already transmitted a notification, which indicates that the status information has changed to at least one of the abnormal states, to the controller module, to transmit said stored status information to the controlling module when the flag information indicates that the relaying module has not yet transmitted the notification to the controlling module and subsequently set the flag information to indicate that the notification has been sent to the controlling module, and to not transmit said stored status information to the controlling module when the flag information indicates that the relaying module has already transmitted the notification to the controlling module.

2. The storage apparatus according to claim 1, wherein said relay module transmits the status information when said relay module has the status information indicative of a change of the operation environment of said storage apparatus.

3. The storage apparatus of according to claim 1, wherein said relay module stores said status information as a flag to be accessed by said controlling module.

4. The storage apparatus according to claim 1, wherein said controller module and said relay module are communicated with Serial Attached SCSI protocol.

5. A method of controlling a storage apparatus having a plurality of storage units for storing data, a plurality of detecting modules, a controlling module, and a relaying module connected to said plurality of detecting modules and said controlling module, the method comprising:
    accessing, by controlling module, the stored data in the plurality of storage units; detecting, by the detecting modules, status information indicative of an operation environment, including abnormal states of at least one of voltage value information, a number of fan rotations, and a temperature related to said storage apparatus;
    relaying, by the relaying module, the stored data between the controlling module and the plurality of storage units and the status information between the controlling module and the plurality of detecting modules;
    storing, in the relaying module, the status information detected by said plurality of detecting modules; setting and storing, in the relaying module, flag information indicating whether the relaying module has already transmitted a notification, which indicates that the status information has changed to at least one of the abnormal states, to the controlling module; and transmitting said status information stored in said relaying module from said relaying module to said controlling module only when the flag information indicates that the relaying module has not yet transmitted the notification to the controlling module and subsequently set the flag information to indicate that the notification has been sent to the controlling module, such that said status information stored in said relaying module is not transmitted from said relaying module to said controlling module when the flag information indicates that the relaying module has already transmitted the notification to the controlling module.

6. A non-transitory computer readable medium storing a program for controlling of a storage apparatus having a plurality of storage units for recording data, a plurality of detecting modules, a controlling module, and a relaying module connected to said plurality of detecting modules and said controlling module, the program when executed by a computer causes the computer to perform a method comprising:

accessing, by controlling module, the stored data in the plurality of storage units; detecting, by the detecting modules, status information indicative of an operation environment, including abnormal states of at least one of voltage value information, a number of fan rotations, and a temperature related to said storage apparatus;

relaying, by the relaying module, the stored data between the controlling module and the plurality of storage units and the status information between the controlling module and the plurality of detecting modules;

storing, in the relaying module, the status information detected by said plurality of detecting modules; setting and storing, in the relaying module, flag information indicating whether the relaying module has already transmitted a notification, which indicates that the status information has changed to at least one of the abnormal states, to the controlling module; and transmitting said status information stored in said relaying module from said relaying module to said controlling module only when the flag information indicates that the relaying module has not yet transmitted the notification to the controlling module and subsequently set the flag information to indicate that the notification has been sent to the controlling module, such that said status information stored in said relaying module is not transmitted from said relaying module to said controlling module when the flag information indicates that the relaying module has already transmitted the notification to the controlling module.

* * * * *

UNITED STATES PATENT AND TRADEMARK OFFICE
CERTIFICATE OF CORRECTION

| | |
|---|---|
| PATENT NO. | : 7,917,664 B2 |
| APPLICATION NO. | : 11/896296 |
| DATED | : March 29, 2011 |
| INVENTOR(S) | : Honjo et al. |

It is certified that error appears in the above-identified patent and that said Letters Patent is hereby corrected as shown below:

Column 16, Line 39 in Claim 3, after "apparatus" delete "of".

Signed and Sealed this
Fourteenth Day of June, 2011

David J. Kappos
*Director of the United States Patent and Trademark Office*